United States Patent
Kramer et al.

(10) Patent No.: US 11,695,725 B2
(45) Date of Patent: *Jul. 4, 2023

(54) ELECTRONICALLY REFERRING A CONTACT WITHOUT DIVULGING CONTACT DATA

(71) Applicant: Groupon, Inc., Chicago, IL (US)

(72) Inventors: James F. Kramer, Foster City, CA (US); Paul C. Ning, Foster City, CA (US)

(73) Assignee: GROUPON, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/443,503

(22) Filed: Jul. 27, 2021

(65) Prior Publication Data

US 2022/0029946 A1    Jan. 27, 2022

Related U.S. Application Data

(63) Continuation of application No. 16/154,757, filed on Oct. 9, 2018, now Pat. No. 11,108,724, which is a
(Continued)

(51) Int. Cl.
*H04L 51/48* (2022.01)
*G06Q 30/0207* (2023.01)
(Continued)

(52) U.S. Cl.
CPC .............. *H04L 51/48* (2022.05); *G06Q 30/02* (2013.01); *G06Q 30/0207* (2013.01);
(Continued)

(58) Field of Classification Search
CPC ............... G06Q 30/02; G06Q 30/0207; G06Q 30/0214; G06Q 50/01
See application file for complete search history.

(56) References Cited

U.S. PATENT DOCUMENTS 5,209,323 A    5/1993  Hopkins
5,471,593 A    11/1995 Branigin
(Continued)

FOREIGN PATENT DOCUMENTS

WO    02/01405 A1    1/2002
WO    2007/090133 A2    8/2007

OTHER PUBLICATIONS

R. Bulander, M. Decker, G. Schiefer and B. Kolmel, "Comparison of Different Approaches for Mobile Advertising," Second IEEE International Workshop on Mobile Commerce and Services, 2005, pp. 174-182, doi: 10.1109/WMCS.2005.8 (Year: 2005).*
(Continued)

*Primary Examiner* — Gabrielle A McCormick
*Assistant Examiner* — Maame Ofori-Awuah
(74) *Attorney, Agent, or Firm* — Alston & Bird LLP

(57) ABSTRACT

An information source, such as an advertiser or product vendor, transfers information to contacts for which the information source has no contact data. The information source stores information in an information database which communicates the information to a referrer which has the desired contact data. The referrer uses a communication device to transfer the information to one or more contacts using contact data.

21 Claims, 1 Drawing Sheet

Related U.S. Application Data continuation of application No. 14/976,664, filed on Dec. 21, 2015, now Pat. No. 10,116,612, which is a continuation of application No. 12/396,467, filed on Mar. 2, 2009, now Pat. No. 9,235,842.

(51) Int. Cl.
*G06Q 30/0214* (2023.01)
*H04L 51/214* (2022.01)
*H04L 67/563* (2022.01)
*G06Q 30/02* (2023.01)
*G06Q 50/00* (2012.01)
*G06Q 50/02* (2012.01)

(52) U.S. Cl.
CPC ......... *G06Q 30/0214* (2013.01); *G06Q 50/01* (2013.01); *H04L 51/214* (2022.05); *H04L 67/563* (2022.05)

(56) References Cited

U.S. PATENT DOCUMENTS

| | | | |
|---|---|---|---|
| 5,697,844 A | 12/1997 | Von Kohorn | |
| 6,259,405 B1 | 7/2001 | Stewart et al. | |
| 6,414,635 B1 | 7/2002 | Stewart et al. | |
| 6,480,885 B1 | 11/2002 | Olivier | |
| 6,549,768 B1 | 4/2003 | Fraccaroli | |
| 6,571,279 B1 | 5/2003 | Herz et al. | |
| 6,618,593 B1 | 9/2003 | Drutman et al. | |
| 6,731,940 B1 | 5/2004 | Nagendran | |
| 6,751,669 B1 | 6/2004 | Ahuja et al. | |
| 6,819,919 B1 | 11/2004 | Tanaka | |
| 6,829,478 B1 | 12/2004 | Layton et al. | |
| 6,834,195 B2 | 12/2004 | Brandenberg et al. | |
| 6,848,542 B2 | 2/2005 | Gailey et al. | |
| 6,915,271 B1 | 7/2005 | Meyer et al. | |
| 6,934,684 B2 | 8/2005 | Alpdemir et al. | |
| 6,944,447 B2 | 9/2005 | Portman et al. | |
| 6,996,413 B2 | 2/2006 | Inselberg | |
| 7,027,801 B1 | 4/2006 | Hall et al. | |
| 7,110,971 B2 | 9/2006 | Wallman | |
| 7,155,455 B2 | 12/2006 | Clendenin | |
| 7,308,254 B1 | 12/2007 | Rissanen | |
| 7,319,986 B2 | 1/2008 | Praisner et al. | |
| 7,543,232 B2 | 6/2009 | Easton et al. | |
| 7,593,740 B2 | 9/2009 | Crowley et al. | |
| 7,774,229 B1 * | 8/2010 | Dernehl | G06Q 30/0239 705/14.1 |
| 7,788,188 B2 | 8/2010 | Kramer | |
| 7,856,360 B2 | 12/2010 | Kramer et al. | |
| 8,027,861 B2 | 9/2011 | Brintle | |
| 8,103,519 B2 | 1/2012 | Kramer et al. | |
| 8,182,328 B2 | 5/2012 | Odom et al. | |
| 8,300,556 B2 | 10/2012 | Kalipatnapu et al. | |
| 8,577,346 B2 | 11/2013 | Dragt | |
| 8,583,447 B2 | 11/2013 | Kramer et al. | |
| 8,583,477 B2 | 11/2013 | Dodge et al. | |
| 8,599,832 B2 | 12/2013 | Altberg et al. | |
| 8,965,784 B2 | 2/2015 | Postrel | |
| 9,235,842 B2 | 1/2016 | Kramer et al. | |
| 2001/0025253 A1 | 9/2001 | Heintz et al. | |
| 2001/0042002 A1 | 11/2001 | Koopersmith | |
| 2001/0042010 A1 | 11/2001 | Hassell | |
| 2001/0043232 A1 | 11/2001 | Abbott et al. | |
| 2001/0051973 A1 | 12/2001 | Green et al. | |
| 2002/0010584 A1 | 1/2002 | Schultz et al. | |
| 2002/0013815 A1 | 1/2002 | Obradovich et al. | |
| 2002/0016461 A1 | 2/2002 | Albers et al. | |
| 2002/0022488 A1 | 2/2002 | Srinivasan et al. | |
| 2002/0034292 A1 | 3/2002 | Tuoriniemi et al. | |
| 2002/0047861 A1 | 4/2002 | Labrie et al. | |
| 2002/0068585 A1 | 6/2002 | Chan et al. | |
| 2002/0087525 A1 | 7/2002 | Abbott et al. | |
| 2002/0095333 A1 | 7/2002 | Jokinen et al. | |
| 2002/0111164 A1 | 8/2002 | Ritter | |
| 2002/0116461 A1 | 8/2002 | Diacakis et al. | |
| 2002/0120774 A1 | 8/2002 | Diacakis | |
| 2002/0123934 A1 | 9/2002 | Tanaka et al. | |
| 2002/0138325 A1 | 9/2002 | Mashimo et al. | |
| 2002/0151315 A1 | 10/2002 | Hendrey | |
| 2002/0160766 A1 | 10/2002 | Portman et al. | |
| 2002/0161657 A1 | 10/2002 | Kojac et al. | |
| 2002/0184653 A1 | 12/2002 | Pierce et al. | |
| 2003/0004802 A1 | 1/2003 | Callegari | |
| 2003/0014275 A1 | 1/2003 | Bearden et al. | |
| 2003/0060214 A1 | 3/2003 | Hendrey et al. | |
| 2003/0073406 A1 | 4/2003 | Benjamin et al. | |
| 2003/0100337 A1 | 5/2003 | Chotkowski et al. | |
| 2003/0115288 A1 | 6/2003 | Ljubicich et al. | |
| 2003/0117432 A1 | 6/2003 | Kautto-Kiovula et al. | |
| 2003/0126015 A1 | 7/2003 | Chan et al. | |
| 2003/0220835 A1 | 11/2003 | Barnes | |
| 2003/0233278 A1 | 12/2003 | Marshall | |
| 2003/0233332 A1 | 12/2003 | Keeler et al. | |
| 2004/0006478 A1 | 1/2004 | Alpdemir et al. | |
| 2004/0006548 A1 | 1/2004 | Mahmood | |
| 2004/0010608 A1 | 1/2004 | Piccionelli et al. | |
| 2004/0015562 A1 | 1/2004 | Harper et al. | |
| 2004/0024846 A1 | 2/2004 | Randall et al. | |
| 2004/0081120 A1 | 4/2004 | Chaskar | |
| 2004/0088551 A1 | 5/2004 | Dor et al. | |
| 2004/0093281 A1 | 5/2004 | Silverstein et al. | |
| 2004/0107283 A1 | 6/2004 | Paddon | |
| 2004/0111476 A1 | 6/2004 | Trossen et al. | |
| 2004/0122810 A1 | 6/2004 | Mayer | |
| 2004/0133480 A1 | 7/2004 | Domes | |
| 2004/0137882 A1 | 7/2004 | Forsyth | |
| 2004/0148638 A1 | 7/2004 | Weisman et al. | |
| 2004/0151315 A1 | 8/2004 | Kim | |
| 2004/0155903 A1 | 8/2004 | Schneeberg | |
| 2004/0193489 A1 | 9/2004 | Boyd et al. | |
| 2004/0203363 A1 | 10/2004 | Carlton et al. | |
| 2004/0203746 A1 | 10/2004 | Knauerhase et al. | |
| 2004/0215793 A1 | 10/2004 | Ryan et al. | |
| 2004/0220922 A1 | 11/2004 | Lovison et al. | |
| 2004/0224703 A1 | 11/2004 | Takaki et al. | |
| 2004/0243478 A1 | 12/2004 | Walker et al. | |
| 2004/0249846 A1 | 12/2004 | Randall et al. | |
| 2004/0266457 A1 | 12/2004 | Dupray | |
| 2004/0266480 A1 | 12/2004 | Hjelt et al. | |
| 2005/0003759 A1 | 1/2005 | Alley | |
| 2005/0038876 A1 | 2/2005 | Chaudhuri | |
| 2005/0043060 A1 | 2/2005 | Brandenberg et al. | |
| 2005/0054352 A1 | 3/2005 | Karaizman | |
| 2005/0054439 A1 | 3/2005 | Rowe et al. | |
| 2005/0075925 A1 * | 4/2005 | Sash | G06Q 30/02 705/14.39 |
| 2005/0076078 A1 | 4/2005 | Salton | |
| 2005/0078088 A1 | 4/2005 | Davis et al. | |
| 2005/0102180 A1 | 5/2005 | Gailey et al. | |
| 2005/0130634 A1 | 6/2005 | Godfrey | |
| 2005/0132305 A1 | 6/2005 | Guichard et al. | |
| 2005/0135305 A1 | 6/2005 | Wentink | |
| 2005/0136949 A1 | 6/2005 | Barnes, Jr. | |
| 2005/0169446 A1 | 8/2005 | Randall et al. | |
| 2005/0174975 A1 | 8/2005 | Mgrdechian et al. | |
| 2005/0177385 A1 | 8/2005 | Hull et al. | |
| 2005/0177614 A1 | 8/2005 | Bourne | |
| 2005/0181803 A1 | 8/2005 | Weaver et al. | |
| 2005/0193054 A1 | 9/2005 | Wilson et al. | |
| 2005/0202817 A1 | 9/2005 | Sudit | |
| 2005/0210387 A1 | 9/2005 | Alagappan et al. | |
| 2005/0227676 A1 | 10/2005 | De Vries | |
| 2005/0228719 A1 | 10/2005 | Roberts et al. | |
| 2005/0235062 A1 | 10/2005 | Lunt et al. | |
| 2005/0251440 A1 | 11/2005 | Bednarek | |
| 2006/0015404 A1 | 1/2006 | Tran | |
| 2006/0026067 A1 | 2/2006 | Nicholas et al. | |
| 2006/0180664 A1 | 8/2006 | Barrett et al. | |
| 2006/0195361 A1 | 8/2006 | Rosenberg | |
| 2006/0217135 A1 | 9/2006 | Moore et al. | |
| 2006/0242014 A1 * | 10/2006 | Marshall | G06F 16/958 707/E17.116 |
| 2006/0278064 A1 | 12/2006 | Lourdeaux | |

(56) References Cited

U.S. PATENT DOCUMENTS

| | | | |
|---|---|---|---|
| 2007/0030824 A1 | 2/2007 | Ribaudo et al. | |
| 2007/0071208 A1 | 3/2007 | Morris | |
| 2007/0072591 A1 | 3/2007 | McGary et al. | |
| 2007/0078965 A1 | 4/2007 | Shimamura et al. | |
| 2007/0112762 A1 | 5/2007 | Brubaker | |
| 2007/0156446 A1 | 7/2007 | Jolly et al. | |
| 2007/0162337 A1 | 7/2007 | Hawkins et al. | |
| 2007/0179792 A1 | 8/2007 | Kramer | |
| 2007/0216535 A1 | 9/2007 | Carrino | |
| 2007/0281689 A1 | 12/2007 | Altman et al. | |
| 2007/0282621 A1 | 12/2007 | Altman et al. | |
| 2008/0005125 A1 | 1/2008 | Gaedeke | |
| 2008/0033776 A1 | 2/2008 | Marchese | |
| 2008/0040187 A1 | 2/2008 | Carraher et al. | |
| 2008/0097822 A1 | 4/2008 | Schigel et al. | |
| 2008/0255939 A1 | 10/2008 | Harmon et al. | |
| 2008/0292080 A1 | 11/2008 | Quon et al. | |
| 2008/0306826 A1 | 12/2008 | Kramer et al. | |
| 2008/0307511 A1 | 12/2008 | Ahtisaari | |
| 2008/0319846 A1 | 12/2008 | Leming et al. | |
| 2009/0024477 A1 | 1/2009 | Kramer et al. | |
| 2009/0070230 A1 | 3/2009 | Silverstein et al. | |
| 2009/0076911 A1 | 3/2009 | Vo et al. | |
| 2009/0089177 A1 | 4/2009 | Dayton et al. | |
| 2009/0191962 A1 | 7/2009 | Hardy et al. | |
| 2009/0234876 A1 | 9/2009 | Schigel et al. | |
| 2009/0254930 A1 | 10/2009 | Lo et al. | |
| 2009/0254971 A1 | 10/2009 | Herz et al. | |
| 2010/0042471 A1 | 2/2010 | Chang et al. | |
| 2010/0049702 A1 | 2/2010 | Martinez et al. | |
| 2010/0125490 A1* | 5/2010 | Kiciman | G06Q 30/0207 705/14.1 |
| 2011/0071895 A1 | 3/2011 | Masri | |
| 2011/0093340 A1 | 4/2011 | Kramer et al. | |
| 2011/0191152 A1 | 8/2011 | Schwartz | |
| 2012/0089453 A1 | 4/2012 | Kramer et al. | |
| 2012/0270563 A1 | 10/2012 | Sayed | |
| 2013/0137464 A1 | 5/2013 | Kramer et al. | |
| 2013/0282490 A1 | 10/2013 | Kramer et al. | |
| 2014/0006129 A1 | 1/2014 | Heath | |
| 2014/0195322 A1 | 7/2014 | Kramer et al. | |
| 2014/0207584 A1 | 7/2014 | Wicha et al. | |
| 2016/0048863 A1 | 2/2016 | Kramer et al. | |

OTHER PUBLICATIONS

"LBS Startups to Watch: A slew of location-based services startups are hoping to make serendipity a little more regular," Red Herring Magazine, Oct. 17, 2005, 5 pages.
"Mobido website", www.mobido.com, Dec. 5, 2005, 10 pages.
"U.S. Appl. No. 13/751,035 Final Office Action", dated Sep. 26, 2014, 19 pages.
"U.S. Appl. No. 13/751,035 Office Action", dated May 6, 2014, 11 pages.
"U.S. Appl. No. 13/919,944 Office Action", dated May 12, 2016, 11 pages.
"WaveMarket website", www.sixsense.com, Dec. 5, 2005, 11 pages.
6th Sense website, www.sixsense.com , 11 pages, (2004).
Appendix to Defendant IBM's Opening Claim Construction Brief, United States District Court for the Northern District of Illinois Eastern Division, Civil Action No. 1:16-cv-05064, *Groupon, Inc.*, Plaintiff v. *International Business Machines Corporation*, filed by Defendants (Feb. 17, 2017) 11 pages.
Appendix to Plaintiff Groupon, Inc.'s Declaration of Dr. Michael I. Shamos in Support of Responsive Claim Construction Brief of Groupon, Inc., United States District Court for the Northern District of Illinois Eastern Division, Civil Action No. 1: 16-cv-05064, *Groupon, Inc.*, Plaintiff v. *International Business Machines Corporation*, filed by Defendants (Mar. 6, 2017) 50 pages.
Appendix to Plaintiff Groupon, Inc.'s Responsive Claim Construction, Part I, United States District Court for the Northern District of Illinois Eastern Division, Civil Action No. 1:16-cv-05064, *Groupon, Inc.*, Plaintiff v. *International Business Machines Corporation*, filed by Defendants (Mar. 6, 2017) 202 pages.
Appendix to Plaintiff Groupon, Inc.'s Responsive Claim Construction, Part II, United States District Court for the Northern District of Illinois Eastern Division, Civil Action No. 1:16-cv-05064, *Groupon, Inc.*, Plaintiff v. *International Business Machines Corporation*, filed by Defendants (Mar. 6, 2017) 183 pages.
Applicant's Opposition to the Motion to Dismiss in *Groupon, Inc.* v. *Int'l Bus. Machs. Corp.*, Civil Action No. 1:16-cv-5064(N.D. III) (Sep. 8, 2016). (Exhibit 1025) 23 pages.
Claim Construction Hearing Before the Honorable Rebecca Pallmeyer (Transcript), United States District Court for the Northern District of Illinois Eastern Division, Civil Action No. 1:16-cv-05064, *Groupon, Inc.*, Plaintiff v. *International Business Machines Corporation*, filed by Defendants (Apr. 3, 2017) 93 pages.
U.S. Appl. No. 14/803,084, filed Jul. 20, 2015, 226 pages.
Complaint for Patent Infringement, United States District Court for the Northern District of Illinois Easter Division, Civil Action No. 1:16-cv-5064, *Groupon, Inc.*, Plaintiff v. *International Business Machines Corporation* (May 9, 2016) 14 pages; Exhibit A, 79 pages.
Complaint in *Groupon, Inc.* v. *Int'l Bus. Machs. Corp.*, Civil Action No. 1:16-cv-5064 (May 9, 2016) (Exhibit 1023) 93 pages.
Decision, Denying Institution of Inter Partes Review 37 C.R.F. sctn. 42.108, Case IPR2017-01452, *International Business Machines Corp.* v. *Groupon, Inc.*, Patent Trial and Appeal Board, Dec. 5, 2017, 29 pages.
Decision, Institution of Inter Partes Review 37 C.R.F. sctn. 42.108, Case IRP2017-01451, *International Business Machines Corp.* v. *Groupon, Inc.*, Patent Trial and Appeal Board, Dec. 5, 2017, 33 pages.
Declaration of Sigurd Meldal, Dr. Sc., *International Business Machines Corp.* Petitioner v. *Groupon, Inc.* Patent Owner, Case IPR2017-01451, U.S. Pat. No. 7,856,360 B2 (dated Mar. 22, 2018) 121 pages.
Defendant IBM's Answer to Plaintiff Groupon, Inc.'s Complaint for Patent Infringement, United States District Court for the Northern District of Illinois Eastern Division, Civil Action No. 1:16-cv-05064, *Groupon, Inc.*, Plaintiff v. *International Business Machines Corporation*, filed by Defendants (Jan. 18, 2017) 13 pages.
Defendant IBM's Memorandum in Support ofIis Motion to Dismiss Groupon's Complaint for Failure to State a Claim Upon Which Relief Can Be Granted, United States District Court for the Northern District of Illinois Easter Division, Civil Action No. 1:16-cv-5064, *Groupon, Inc.*, Plaintiff v. *International Business Machines Corporation*, filed by Defendants (Aug. 15, 2016) 20 pages.
Defendant IBM's Opening Claim Construction Brief, United States District Court for the Northern District of Illinois Eastern Division, Civil Action No. 1:16-cv-05064, *Groupon, Inc.*, Plaintiff v. *International Business Machines Corporation*, filed by Defendants (Feb. 17, 2017) 30 pages.
Defendant IBM's Reply Briefin Support ofIts Motion to Dismiss Groupon's Complaint for Failure to State a Claim Upon Which Relief Can Be Granted, United States District Court for the Northern District of Illinois Easter Division, Civil Action No. 1:16-cv-5064, *Groupon, Inc.*, Plaintiff v. *International Business Machines Corporation*, filed by Defendants (Sep. 13, 2016) 22 pages.
Defendant IBM's Reply Claim Construction Brief, United States District Court for the Northern District of Illinois Eastern Division, Civil Action No. 1:16-cv-05064, *Groupon, Inc.*, Plaintiff v. *International Business Machines Corporation*, filed by Defendants (Mar. 6, 2017) 21 pages.
Deposition Transcript of Sigurd Meldal, Dr. Sc. (Jun. 13, 2018) (cited as "Meldal Dep. Tr."), (Exhibit 1022) 289 pages.
Exhibit 2008 of Patent Owner's Response-Transcript of Susan Spielman's Testimony, *International Business Machines Corp.* Petitioner v. *Groupon, Inc.* Patent Owner, Case IPR2017-01451, U.S. Pat. No. 7,856,360 B2 (dated Feb. 21, 2018) 355 pages.

(56) References Cited

OTHER PUBLICATIONS

Exhibit 2009 to Supplemental Patent Owner's Response - Supplemental Declaration of Sigurd Meldal, Dr. Sc., *International Business Machines Corp.* Petitioner v. *Groupon, Inc.* Patent Owner, Case IPR2017-01451, U.S. Pat. No. 7,856,360 B2 (dated May 31, 2018) 18 pages.
Gopal, R. D., Walter, Z. P., & Tripathi, A. K. (2001). Admediation: New horizons in effective email advertising. Communications of the ACM, 44(12), 91-96. Retrieved from https://dialog.proquest.com/professional/docview/730462493?accountid=142257.
IBM's 1451 Demonstrative Exhibits for Sep. 5, 2018 Oral Hearcing, in Case IRP2017-01451 (Sep. 4, 2018) (49 pages).
International Business Machines Corporation's Reply in Support of Its Petition, Case IPR2017-01451, U.S. Pat. No. 7,856,360 dated Jul. 2, 2018 (30 pages of Reply) and including Exhibits Nos. 1021, 1022, 1023, 1024, and 1025.
Kirk, "Mobile Phone Location Technology Fights Card Fraud," PC World, Business center, 2 pages, (2009). [Retrieved from the Internet Jun. 19, 2009: <URL:http://www.pcworld.com/businesscenter/article/165468/mobile_phone1>].
M. Strasser and A. Zugenmaier, "Personalization through mask marketing," 36th Annual Hawaii International Conference on System Sciences, 2003. Proceedings of the, Big Island, HI, USA, 2003, pp. 8 pp.-, doi: 10.1109/HICSS.2003.1174582. (Year: 2003).
Marriott, "With GPS, getting around gets easier", C-Net, www.news.com/With+GPS%2C+getting+around+gets+easier/2100-1041_3-5998828.html, Dec. 18, 2005, 4 pages.
Motion to Dismiss Groupon's Complaint for Failure to State a Claim Upon Which Relief Can be Granted, United States District Court for the Northern District of Illinois Easter Division, Civil Action No. 1: 16-cv-5064, *Groupon, Inc.*, Plaintiff v. *International Business Machines Corporation*, filed by Defendants (Aug. 15, 2016) 3 pages.
Opposition of Plaintiff Groupon, Inc. to Motion to Dismiss, United States District Court for the Northern District of Illinois Easter Division, Civil Action No. 1:16-cv-5064, *Groupon, Inc.*, Plaintiff v. *International Business Machines Corporation*, filed by Defendants (Sep. 8, 2016) 23 pages.
Patent Owner's Demonstratives Under 42.70b for Sep. 5, 2018 Oral Hearing, in Case IRP2017-01451 (Sep. 4, 2018) (63 pages).
Patent Owner's Preliminary Response, *International Business Machines Corp.* Petitioner v. *Groupon, Inc.* Patent Owner, Case IPR2017-01451, U.S. Pat. No. 7,856,360 B2 (dated Sep. 6, 2017) 63 pages.
Patent Owner's Preliminary Response, *International Business Machines Corp.* Petitioner v. *Groupon, Inc.* Patent Owner, Case IPR2017-01452, U.S. Pat. No. 7,856,360 B2 (dated Sep. 6, 2017) 75 pages.
Patent Owner's Response, *International Business Machine Corp.* Petitioner v. *Groupon, Inc.* Patent Owner, Case IPR2017-01451, U.S. Pat. No. 7,856,360 B2 (dated Mar. 22, 2018) 68 pages.
PCT International search Report for application PCT/US2007/061328 dated Sep. 11, 2007.
Petitioner IBM's Petition for Inter Partes Review, IPR2017-01451, dated May 18, 2017, 90 pages.
Petitioner IBM's Petition for Inter Partes Review, IRP2017-01452, dated May 18, 2017, 88 pages.
Plaintiff Groupon, Inc.'s Declaration of Dr. Michael I. Shamos in Support of Responsive Claim Construction Brief of Groupon, Inc., United States District Court for the Northern District of Illinois Eastern Division, Civil Action No. 1:16-cv-05064, *Groupon, Inc.*, Plaintiff v. *International Business Machines Corporation*, filed by Defendants (Mar. 6, 2017) 27 pages.
Plaintiff Groupon, Inc.'s Responsive Claim Construction, United States District Court for the Northern District of Illinois Eastern Division, Civil Action No. 1:16-cv-05064, *Groupon, Inc.*, Plaintiff v. *International Business Machines Corporation*, filed by Defendants (Mar. 6, 2017) 31 pages.
Record of Oral Hearing, which was held on Sep. 5, 2018, in in case IRP2017-01451 (Sep. 5, 2018) (76 pages).
Response to Final Invalidity Contentions of Plaintiff Groupon, Inc. in *Groupon, Inc.* v. *Int'l Bus. Machs. Corp.*, Civil Action No. 1:16-cv-5064 (N D. III)(May 17, 2017) (Exhibit 1021) 215 pages.
Supplemental Patent Owner's Response, IPR2017-01451, dated May 31, 2018, 11 pages.
Transcript of Claim Construction Hearing in *Groupon, Inc.* v. *Int'l Bus. Machs. Corp.*, Civil Action No. 1:16-cv-5064 (N.D. III.) (Apr. 3, 2017), (Exibit 1024) 93 pages.
U.S. Appl. No. 12/396,467 Final Office Action, dated Jun. 5, 2014, 13 pages.
U.S. Appl. No. 12/396,467 Final Office Action, dated Jun. 16, 2015, 12 pages.
U.S. Appl. No. 12/396,467 Final Office Action, dated Aug. 13, 2012, 24 Pages.
U.S. Appl. No. 12/396,467 Office Action, dated Oct. 6, 2011, 25 Pages.
U.S. Appl. No. 12/396,467 Office Action, dated Mar. 2, 2015, 7 pages.
U.S. Appl. No. 12/396,467 Office Action, dated Aug. 15, 2013, 17 Pages.
Vaugh-Nichols, "FAQ: How Google Latitude locates you," ComputerWorld, www.computerworld.com, 3 pages, (2009). [Retrieved from the Internet Jun. 19, 2009: <URL: http://www.computerworld.com/s/article/9127462/FAQ_How_Google_latitude_locates_you_>].
Wavemarket website, www.wavemarket.com, 11 pages, (2004).
Written Opinion for International Application No. PCT/US2007/061328 dated Sep. 11, 2007.

* cited by examiner

ELECTRONICALLY REFERRING A CONTACT WITHOUT DIVULGING CONTACT DATA

RELATED APPLICATIONS

This application is a continuation of and claims the priority benefit of U.S. patent application Ser. No. 16/154,757, filed Oct. 9, 2018, which is a continuation of and claims the priority benefit of U.S. patent application Ser. No. 14/976,664, filed Dec. 21, 2015 (now U.S. Pat. No. 10,116,612), which is a continuation of and claims the priority benefit of U.S. patent application Ser. No. 12/396,467, filed Mar. 2, 2009 (now U.S. Pat. No. 9,235,842), each of which is hereby incorporated by reference.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2015, GROUPON, INC.

FIELD

The field of this invention is privatized providing of information.

BACKGROUND

There are commercial software utilities, such as Plaxo, that allow you to access contact lists you have associated with various email programs. For instance, using Plaxo, you could instruct a computer program to access your contact lists for your Yahoo, Gmail, Outlook Express and AOL accounts to allow you to send information to desired contacts in those lists. Amazon.com allows you to forward product information to a friend by entering your friend's email address. CitySearch allows you to send yourself a text message with a restaurant listing by entering your mobile phone number. In these exemplary cases, Plaxo, Amazon.com and CitySearch gain access to the end-recipient contact phone number or email address in order to send the contact the desired information.

Wishlist Buddy™ is a software program that helps people save money on things they have in their Amazon corn Wishlist™. To use the Wishlist Buddy, a person sets target prices for items they have on their Amazon.com Wishlist, and then if any of those items falls beneath such prices, Wishlist Buddy emails the person an alert to let them know.

When right-clicking on non-Flash™ web-based advertisements many browsers give you the option to email to someone a link related to the ad.

It is desirable that you not have to disclose to a source of information the contact data, including but not limited to the telephone number and email address, of a contact to whom you wish the information to be communicated. It is also sometimes desirable to send information to contacts where the contact data is stored on a mobile communication device, such as a mobile phone, without your needing a special program on your phone. There is, therefore, a need to provide a method whereby information from a source can be readily communicated to a contact without disclosing contact data concerning the contact to the information source.

For example, an organization such as a social network involves members who have contact data concerning friends who are not members. The social network has an interest in encouraging its members to enlist their friends into the social network. The subject system provides a novel method to allow members to invite others to join the social network without disclosing to the social network contact data concerning such friends. In this way the member can protect their friends from being contacted by the social network without the request of the member or friend.

SUMMARY OF THE INVENTION

In the subject method an information source provides information, such as advertisements (including web-page ads) about any of a wide range of types of products and services, discounts, offers, political statements, public announcements, and the like (the "Information"), to one or more contacts by transmitting such Information via one or more referrers. A referrer has access to their own contact database, which may comprise a contact list, with associated contact data. The referrer transmits such Information by a communication device to the referrer's contacts. The Information source is not required to have access to the contact data. Typically, the referrer gets the Information from an Information database (which may be part of a website) to which various Information sources provide Information. The Information sources are typically unrelated to, and independent from, each other and the website or organization that is associated with the Information database.

DETAILED DESCRIPTION OF THE INVENTION

Figure 1:
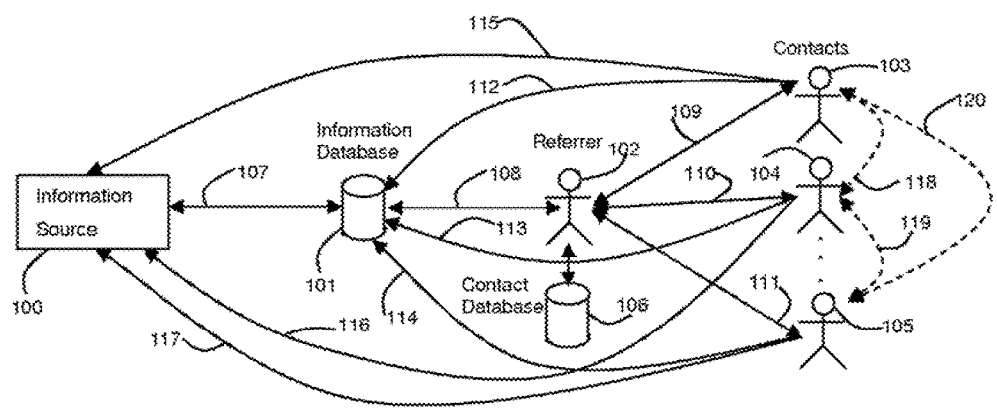
FIG. 1 is a block diagram depicting Information flow from an Information source to an Information database, then to a referrer, then to one or more contacts.

A method is provided for expanding a target audience with increased likelihood that the recipient will receive the Information and consider the Information. The method goes beyond those recipients who are readily available to an Information source, reaching a finer-grained resolution of recipients. The method permits Information to be disseminated to an audience which may not be available to the Information source. Using a referral network, the Information is transmitted to the recipient by a trusted source.

The method allows for communication to an end recipient, referred to as a contact, where the Information source is not required to have addresses for electronic communication of Information to the contact. Using a contact communication device the Information is transmitted to a contact from an Information database that receives input from Information sources. An Information source can be an organization that maintains or supervises the Information database, or supervises a service provider selected by the organization that manages the Information database and has members for which the organization has member data, including at least an email address or a mobile communication number. When the Information database is managed by a service provider selected by the organization, the service provider is typically subject to the same constraints the organization has on use of contact data. The members are named "referrers," since the members play a role in transferring the Information to the contact. The referrer has contact data for one or more contacts, which contacts are known to the referrer. The contact data can be stored in a contact database, which may reside on a personal computer, laptop, mobile phone, or other equivalent device. An Information source may provide Information to more than one referrer. Referrers don't necessarily know or communicate with each other; whereas, a referrer typically either (a) knows, (b) has communicated with or (c) has had a prior relationship with their contacts. A referrer's contacts list often contains only a few hundred contacts or fewer.

The method also allows for customized transmission of Information to the contact where the referrer can ensure that the transmitted Information is relevant to the contact and may provide a personal message associated with the Information. The organization will usually also have a related website which it typically maintains. Such a website comprises the Information database and can also comprise a contact database comprising demographics, interests of the contact, and the like (which are organized into categories), normally supplied by the referrer, but may be supplied or edited by the contact, where the referrer has a personal account with restricted access on the website. Therefore, the website may include contact data that comprises not only the addresses and numbers of the members and contacts, but also personalized data concerning each of the contacts. The website may have Information source accounts, referrer accounts and contact accounts, where each such account may be private and password protected.

The method employs a first software functionality for processing the Information from the Information source and transmitting the Information to one or more referrers. The Information may be transmitted in the form in which it is received or may be modified to where it provides only the meaning or significance of at least a portion of the received Information. The modified Information will generally provide the basic information intended to be transmitted by the Information source as may be selected or restricted by the referrer or categories. The Information may be filtered based on the contact data, so that the Information which is sent to a referrer for further transmission to a contact is selected in accordance with the contact data. The first software functionality may run on a web site that provides for a private account for a referrer, where the referrer may provide the contact data, which may be retained in confidence. The referrer can then transmit the received Information to the contact by means of a contact communication device.

The subject method is distinguished from other methods by having at least one each from the following two groups of components. Included in the first group is assigning a referral identification to a referrer, also called a referrer identification code. The referral identification is transmitted to the contact. The identification allows for tracking of the actions of the referrer and the referrer's contacts. In this way, consideration can be provided as an incentive for the referrer to actively participate in the program and work with the organization to ensure the success of the subject method. A referrer or contact can provide contact data organized into categories for associating the nature of the Information to the nature of the contact. To provide this capability, a second software functionality is provided that relates the category(s) for the Information to the contact data for the contact. Included with having categories is the opportunity for the referrer or contact to specify categories to determine which portion of the Information is to be received by the contact.

The nature of the categories will be expanded on subsequently. Another component of the first group is that the Information is received from unrelated independent sources or for profit sources. In this way, advertisers, businesses or other for-profit organizations can use their advertising dollars more efficiently in that they can reach a larger audience for which they do not have contact data and provide the Information to this audience in a manner that will not be treated as spam and is more personal to the recipient as being from someone the recipient knows. While the majority of the Information will be from such sources, that is, greater than 50 percent of the informational items transmitted, some of the Information may come from related or non-profit organizations.

A referrer may elect to (1) review Information and decide to which contact to send the Information, (2) have a contact be automatically identified based on matching categories of the Information with desired categories of the referrer's contacts, but where the referrer then makes the final decision about whether or not to send the Information to the identified contact, or (3) have a contact be automatically identified based on matching categories of the Information with desired categories of the referrer's contact, and then to have Information automatically sent to a contact without review by the referrer.

The opinion of the referrer typically is respected by the referrer's contacts. Thus, the subject patent provides a way for a respected referrer to promote Information by peer influence.

These aspects when used together provide for an efficient system for a commercial entity to direct advertising or other communication to a target audience via an intermediary recognized by the target audience, who can also serve as a proponent of the advertising or communication. Consideration can be provided as an incentive to ensure the favorable transmission of the Information.

In the second group of components, a third software functionality is provided to allow the referrer to request and receive Information in writing. The content of the Information is composed in a form for receipt by the contact, rather than the referrer. The referrer provides the Information to the contact, where the referrer will be recognized by the contact. This can be expedited with a website, where the Information is stored and the referrer requests the Information from the website. The referrer can have a private account on the website that is restricted to use by the referrer. As already alluded to, a further component is that the method allows for rewarding the referrer and/or contact for participating in the method and acting on the Information. By combining the referral identification with consideration, such as promotional rewards, the referrer will be encouraged to actively participate.

The organization can be a web-based social network to provide for the association between the referrers and the organization, so that the referrer and contacts have an existing relationship with the organization. Often times, such social networks allow its members to mutually agree to be "friends" in the social network. Within the organization, the contacts could have access to contact data of other members. Another component, which may be implemented by an additional software functionality, is for the referrer to withhold contact data from the Information source and the use of the contact data by the organization is restricted. Also, the organization can have a prearranged formal referring relationship with the referrer. By providing for a formal relationship, the referrer participates actively with the understanding of the rules of the method and the enjoyment of rewards, as available. Typically, a formal referring relationship lays out the terms whereby the referrer receives consideration. Such a relationship also typically describes the organization's restrictions on use, dissemination and privacy of the contact data.

Various combinations of the different groups are of interest, such as (1) the referral identification coupled with the referrer requesting information and/or the web-based social network and (2) the data having categories coupled with the referrer requesting information and/or the web-based social network.

Any of the components described above may be associated with having the contact data withheld from the Information source, having use of the contact data by the organization restricted and the organization having a prearranged formal referring relationship with the referrer.

An attractive aspect of the method allows the referrer and the contact to participate in choosing categories to be received by the contact and to modify the menu of categories from time to time. Software can be provided that allows automatic selection of contacts to receive the Information based on common categories between the Information and the contact. Typically, the contact will have an ability to "lock" a category after specifying its desired state such that the referrer cannot edit the contact's selection.

In one aspect of the subject invention, the method provides for providing Information from at least one Information source to a contact having a contact communication device. The method employs an Information database, supervised by an organization, for receiving Information from the Information source. A referrer, an individual, associated with the organization, has contact data for contacts in a contact database, which contact database may be on a communication device and/or on a website. A software functionality is employed for processing the Information. The method comprises communicating the Information from the Information source to the referrer, the referrer transmitting the Information to the contact by means of the contact communication device, assigning a referral identification to the referrer for tracking with the referral identification being transmitted to the contact, with the organization giving consideration to the referrer or the contact for acting on the Information, and optionally the contact communication device transmitting the referral identification to the Information source or a third party to identify the referrer.

In another aspect, the method is employed in obtaining members for an organization. In a particular embodiment, the prospective members have mobile phones. A website comprising an Information database containing an invitation is employed. A member of the organization, called a referrer, has contact data for a prospective member in a contact database on the referrer's mobile phone. The prospective member's contact data is withheld from the organization. The method comprises the referrer requesting the invitation from the website, where the invitation addresses a prospective member not the referrer, communicating the invitation from the website via a text message to the referrer's mobile phone, and the referrer forwarding the text message to the prospective member by means of the respective mobile phones.

To further expand on the subject invention, without direct access to contact data for a contact (or plurality of contacts), an Information source (or plurality of Information sources) can provide Information to the contact (or plurality of contacts) using a referrer (or plurality of referrers), whereby each referrer has access to a contact database, usually a contact list (or plurality of contact lists) and selects a contact (or plurality of contacts) to receive the Information. For the purposes of this invention, a contact list will be used as equivalent to a contact database and is sometimes referred to as an address book by some people. Typically, the Information provided by the Information source may relate to any of a large variety of different types of products and services, not merely a single type of product or service with categorical differences.

The Information source provides Information to a data processor, which may be associated with a web server, to collect and store Information in an Information database and to transmit selected Information to the referrer. The Information source may be the originator of the Information, such as an advertiser. The Information database may act as an Information aggregator, Information portal or Information repository of Information coming from Information sources or other Information databases. Information of the Information database may be "scraped" from a website. The Information database may be associated with an organization or a website. In one example, the Information database is associated an Information website from which the referrer retrieves the Information, where Information sources and referrers have accounts with the Information website.

The referrer uses a communication device, which typically includes or accesses a contact database of contact data, to communicate with the contact. Typically, the referrer is an individual and the contacts are his/her friends or acquaintances, or where the referrer has previously communicated to or received communication from the contact, typically personally, telephonically, via email, text message or other electronic means. Usually, the communication device will be a mobile communication device or desktop communication device or the like. The contact will receive the Information via their own communication device. Communication of the Information from the Information source to the referrer, and then transmission from the referrer to the contact, is typically over a wireless or wired medium, including but not limited to the internet, mobile phone network, cable, DSL, WiFi, Bluetooth, RF and the like. The referrer has a list of contacts with associated contact data. The referrer selects one or more contacts from the referrer's list of contacts and transmits the Information received from the Information source to the contact(s).

A mobile communication device includes, but is not limited to, a mobile phone, a mobile computer, a pager or any other wireless device capable of receiving and sending a signal and interacting with the user, including but not limited to a product consumer or social network organization member.

The subject invention has particular application where the contact list is a private list which the referrer wishes to retain as a private list and not divulge any data associated with the list, particularly to an organization that might use the list for advertising purposes. As indicated previously, the subject invention can be used effectively with a social network organization. Consider where the social network organization wishes to expand its membership through its existing members who can serve as referrers. The social network organization has a data processor associated with its website that provides Information to the referrer for transmission by the referrer to a contact. The referring member can request the Information from the data processor. The Information may include a description of the social network organization, an invitation to join, a website address and/or email address for the contact to be able to join the social network organization. The Information may be in a form such that it was written to a contact as a prospective new member, rather than being written to a referrer. Thus, all the referrer needs to do is forward the Information to the contact, unmodified, making it quick and easy for the referrer, and at the same time, ensuring that the Information is presented in the manner the Information source, being a social network organization, desires. Until the contact contacts the social network organization with its contact data, the organization has no access to the contact data of the contact. The referrer need not be concerned about disclosure of the contact data and since the Information is coming from the referrer as a trusted source, Information from the referrer is likely to be opened, read or otherwise acted upon by the contact. In addition, the Information will have the endorsement of the referrer. Of course, the social network will have many more interests for transmission of Information by a referrer than expanding membership, such as advertisements, offers, promotions, event notices, etc.

As an example of an invite function on a mobile phone, a referrer who is a member of a social network organization may be presented with a link on their mobile phone entitled, "Invite Friends". Upon selecting the link, the referrer is presented with a prompt saying, "Receive a text message on your phone that you can forward to any of your contacts." If the referrer selects "OK" to this prompt, the referrer receives a text message stating, "Join me on this cool new 'nightlife networking' site and we can meet up at bars & clubs, find new friends and get drink discounts: http://m.hoozware.com." The referrer can then simply choose contacts in their contact list on their mobile phone to which the referrer can easily forward the text message. This scenario eliminates the need for the referrer to author and re-type a message on their mobile phone in order to invite his/her friends to join the social network organization. This scenario of forwarding a text message not only makes sure the intended Information is accurately conveyed to contacts, but it facilitates and expedites the process for the referrer. This scenario also does not require that the referrer load any special software onto their mobile phone in order to access their contact list, but rather the phone's built-in forwarding feature and contact-list-access mechanism is utilized.

In a first embodiment of the subject invention, only the referrer is a member of a social network organization. In a second embodiment, the Information source and referrer are both associated with the same social network organization and contacts are not associated with the social network organization. In a third embodiment, the Information source, the referrer and the contact are all associated with the same social network organization. In a fourth embodiment, the Information source, the referrer and a first and second contact are all associated with the same social network organization, and the first and second contact are able to communicate with each other using the social networking organization. In one version of the fourth embodiment above, the first and second contact may be able to communicate with each other using the same communication devices they receive Information from the referrer. In any of the above embodiments, the Information communicated by the Information source pertains to the social network organization.

While the subject invention has been illustrated above with a social networking organization, it can find application in any situation where a first entity (e.g., a person or organization) may have a relationship with a second entity (e.g., a person), and where the first entity is able to communicate Information to, and may communicate with, the second entity via a data processor associated with an Information database. The first entity may serve as an Information source originating Information. Such a second entity has a contact list and a communication device and may serve as a referrer to receive Information from the Information source, optionally augment it with additional data, and transmit such augmented Information to contacts on the referrer's contact list, where each contact is a third entity (e.g., a person or organization). The referrer may request Information from the Information database that the referrer wishes to transmit to the contacts. In this way, the first entity can have Information transmitted to a broader audience of contacts than it could reach using only its own contacts by having its Information transmitted to the contact lists of multiple referrers. Therefore, the subject method circumvents problems associated with mass distribution of Information to audiences through electronic means by sources unknown to them, e.g., spam, since such Information is mainly ignored and can irritate the recipient contact. Employing the subject invention, Information is filtered through referrers who represent "trusted sources" to contacts on their contact lists and who endorse the Information. Because the Information comes from a known source, the Information is more likely to find acceptance with the contact.

In general, the subject method finds application with companies that wish to advertise products, activities, etc. In one embodiment for enhancing the efficiency of the referrer in transferring Information to contacts, the referrer is provided categories for associating with relevant contacts. The categories may include demographics, behavior, interests, social graphs, previous purchases, gift requests (such as product or service requests), etc. Each contact in the referrer's contact list may be associated with one or more categories. Desirably, the contact may inform the referrer of the categories the contact feels are relevant or revise the categories selected by the referrer. The referrer determines the Information the referrer wishes to pass along to the referrer's contacts. The referrer may determine the Information in a variety of ways, including but not limited to:

a. The Information database may be associated with a website where the referrer may go (1) to select items of Information to be downloaded to the referrer's communication device for transmitting to the referrer's contacts, optionally after augmenting with additional data; or (2) to determine which items of Information are to be transmitted to the referrer's contacts directly from the website, optionally after augmenting with additional data.

b. The referrer may issue a command to the Information database requesting to receive Information for transmitting to the referrer's contacts, optionally after augmenting with additional data.

c. The Information database may initiate sending the referrer an Information package in abbreviated form from which the referrer may select the portion of the Information package which the referrer believes may be of interest to the referrer's contacts. The referrer may then request from the full Information as to the referrer's selection.

Demographics include, but are not limited to gender, birthdate, height, eye/hair color, body type, address, zipcode, hometown, ethnicity, spoken language, education, occupation, income, political view, marital status, sexual orientation, religion, living situation, number of kids, desire for kids, pets, astrological sign, and the like. Behavior includes, but is not limited to exercise habits, sports participation, body art, smoking/drinking frequency, diet, favorite music, favorite places to go, favorite drink, favorite show, favorite book, and the like. Interests include, but are not limited to business networking, cards/games/puzzles, casino gaming, coffee & conversation, community service/volunteering, computers/internet, cooking, crafts/hobbies, dining, fine arts/museums, friends/family, gardening, meeting new people, movies/videos, listening to music/concerts, playing music/singing, nightclub dancing, performing arts, photography, politics, reading, religion/spirituality, shopping, television, travel/sightseeing, video games, watching sports, wine tasting, and the like.

Furthermore in this embodiment, advertisers can submit Information to the Information database for dissemination. The Information from the advertiser may include general content about the advertiser, promotional materials, including but not limited to available products, discounts, location availability, political or non-profit content, or other content typically associated with coupons. The Information communicated by the Information database indicates the categories associated with the Information. The referrer then compares the indicated categories of the Information with the referrer's contact list, optionally matching the indicated categories of the Information with the categories associated with the contacts, to determine to which contacts the referrer should transmit the Information. An optional computer program can be provided to the referrer to be installed on or accessed by the referrer's communication device to facilitate the matching of and transmission to the appropriate contacts of the Information. Such computer program may be accessed from a website containing, controlling or otherwise associated with the Information database.

Consideration may be given to encourage referrers to refer Information and contacts to receive and/or act upon Information. Consideration may include rewards, such as monetary rewards, gift rewards, product or discount rewards, opportunities to participate in particular functions, tickets to events, social recognition, etc. Different avenues may be employed in presenting the consideration depending upon (1) the nature of the consideration, (2) whether the consideration is directed to the referrer, contact or both, (3) the manner in which the consideration is presented, and (4) the like.

Consideration can be presented as a game of chance, such as a simulated roulette wheel, a shell game, choosing a card, number or word from a set, where the referrer or contact has the opportunity to win a reward. The consideration may be associated with a coupon, either electronic or paper, where redemption of the coupon by the contact results in a reward for the referrer, the contact, or both.

Consideration may be given to the contact for a contact action, including, but not limited to acting upon the Information, such as viewing it, clicking on it, purchasing an advertised product, attending an advertised event, and the like. Consideration may be given to the referrer for a referrer action, including, but not limited to, transmitting the Information to the contact. Consideration may be given to a referrer after a predetermined number of contacts have been sent Information by the referrer or when one or more of the referrer's contacts acts upon the Information. Consideration may also be given to a contact after the contact has received or viewed a predetermined amount of Information. Consideration typically is not given to a referrer based solely on a purchase by a contact to whom the referrer sent the Information and where the Information relates to or encourages the purchase.

In order to track or otherwise know which referrer has transmitted Information to a contact, a referrer identification code, also called a referral identification or just referral ID can be employed. The referrer may register with the Information source to receive their own unique referrer identification code. The referrer identification code may be alphanumeric, symbols, etc. Tracking of each referrer allows for consideration to be directed to a particular referrer based on the actions of that referrer and the contact to whom they provide Information. Typically, Information from an advertiser will also include a code for the tracking convenience of the advertiser.

Computer software, which may comprise multiple software components providing functionality, may be used to organize and combine many of the features of the subject invention and to facilitate their use. A special file format for this purpose, called a Referral File Format™ (RFF™) as well as computer software, called RFFware™, is described below.

The RFF is a container file format that many different entities may write to or read, including, but not limited to: Information sources may write to, Information may be written to, referrers may write to and read, and contacts may read. In accordance with the referral file format, an RFF file may comprise, but is not limited to:

a. Information and associated categories;
b. one or more data formats, including but not limited to 3GP, RSS, SMS, HTML, HTML-MP, PDF, JPEG, TIFF, Flash, MPEG, MOV, AVI, WMV, WMA, MP3, M4P, WAV and the like;
c. details about the Information source or the referrer, such as the referral ID;
d. a feedback mechanism, such as JavaScript, that reports to the Information source when the Information is read by a contact as well as other actions performed by the referrer and contact;
e. click-through links, advertisements, and the like;
f. a simple text message where the Information is condensed to a small or summary text message with a link or links to more of the Information or additional related or unrelated Information;
g. an encapsulation of Information from a webpage, with or without the original advertisement, or with replacement or additional advertisements;
h. a hyperlink to the appropriate location on a website where the contact who received the RFF file can modify their categories for specifying future desired Information; and
i. a pointer or link to the Information where the Information may be static or dynamic Information.

An RFF file might not comprise Information, but may merely be associated with Information. For example, an RFF file might be a file containing one or more web links to Information or additional links that eventually lead to Information.

A website may include links to data provided by third-party sources, where the third-party sources are independent from the website, and where the data may be static or dynamic data. For instance, one may get an RFF file from a web site that aggregates product reviews or product pricing provided by other websites, where such other websites are referred to as third-party sources. The product reviews and product pricings listed on such third-party sources are third-party data. The RFF file from the aggregating website may contain links to such third-party sources or links to such third-party data. The RFF file may also directly contain the actual third-party data from the third-party sources. Third-party data may also comprise advertisements from third-party sources.

An RFF file can allow an advertiser to block the RFF file related to their advertisement from being viewed or emailed to someone else. For example, the advertiser might want an offer to only go to someone who visits a particular website. The advertiser might want an ad to only go to a contact with certain categories. In the case where an advertiser is charged per recipient of an ad they send out, the advertiser might not want their ad to be sent to anyone without specified categories.

The subject invention may be used by a referrer to quickly and easily inform their friends or associates of various products and services without disclosing the contact data (including but not limited to email address, phone number, name, street address, etc.) for such friends and associates. One example is where a generic product or service webpage has a "Privately Inform Contacts" link, which when selected matches the product or service with the referrer's contacts, e.g., friends or associates, optionally using categories and allows the referrer to transmit the Information, a link to the Information, or content associated with the Information, to one or more of the matched contacts. In this way, vendor advertisements are leveraged by allowing referrers to easily forward Information to their own friends and contacts; thus, reaching the "last mile."

In one embodiment of the subject invention, when a referrer hovers their mouse over an advertisement on a webpage, or right-clicks on the ad, there is a pop-up or dropdown box that prompts to "Match to Friends." If selected, the referrer's friends and/or other contacts are prompted for further selection. The consideration may be shown that the referrer would receive for sending Information relating to the advertisement to a particular prompted contact.

In general, RFFware is utility software that, among other things, makes it easier for a referrer to search for, locate and access various Information from an Information database for transmitting to contacts (where such Information may be contained in, referenced by, or otherwise associated with an RFF file), as well as augment or otherwise customize the RFF file, determine to which contacts to send the RFF file, send the RFF file to such contacts, follow up with such contacts and review statistics about which of such contacts acted upon the RFF file and how. RFFware comprises software that may be resident on a local data processor, accessed remotely over a network and/or run on a hosted computer server. In one example, a referrer may use a web browser to login to their account on a remote computer server where they access the functionality of the RFFware software. For instance, an Information database may be associated with a website to which advertisers may login to their accounts to post Information they wish to disseminate (where such Information may be categorized), and to which referrers may login to their accounts to access posted Information they wish to send to their contacts.

Whether run remotely, or on the referrer's local computer, RFFware may help perform one or more of the following functions, yet at no time allowing the Information source to have access to the referrer's contacts or contact data without the referrer's permission:

a. allow the referrer to determine the consideration being offered to a referrer or contact for a referrer action or contact action regarding the Information;

b. augment the RFF file to include the referrer's referral ID;

c. allow the referrer to augment the RFF file to include a customized message regarding the Information;

d. generate a master list of contacts with their associated contact data when provided input from the referrer regarding referrer's various webmail login usernames and passwords and email programs identifying the accounts from which to generate the master list;

e. allow the referrer to specify when to re-generate the master list of contacts;

f. allow the referrer and contacts to specify categories associated with the contacts, optionally where the referrer may choose send a form to a contact asking the contact to specify their desired categories, and optionally where RFFware then assimilates the specified categories with the contact's associated contact data;

g. match the categories associated with the Information with the categories associated with the contacts to produce a suggested recipient list;

h. allow the referrer to add contacts to or delete contacts from the suggested recipient list to provide a finalized recipient list;

i. allow the referrer to preview the RFF file to see exactly how each contact will see it;

j. send the RFF file to the contacts of the finalized recipient list, including but not limited to sending the RFF file to an email address, sending as an instant message, sending the RFF file as a text message to a telephone number, sending the RFF file as a voice message to a telephone or computer, and/or sending the RFF file to a fax machine;

k. if desired, restrict re-forwarding of an RFF file by a referrer's contact to the contact's own contacts;

l. certify that the RFF file is virus free;

m. alert the referrer, optionally via text message, when there is new Information on the Information database relates to one or more of the referrer's contacts;

n. allow the contact to view the Information received by them from multiple referrers, where the contact may go to a website to view the Information;

o. sort Information for the contact based on the contact's relationship with the referrer or based on the quality or relevance of the Information the referrer previously provided to the contact;

p. confirm to an Information source how many contacts a particular referrer sent their Information to;

q. provide an editable "from" email address for a referrer so a contact sees the Information coming from a trusted email address;

r. allow the referrer to add a referrer attachment in order to personalize the Information before sending to a contact, optionally by providing message examples via a drop-down box, such as "I just bought this and though you might like it, too";

s. when a referrer sees an advertisement online having an RFF link, when the referrer selects the link, the referrer is prompted with contacts to forward the Information to where the contacts match the Information's categories; and t. extract a desired portion of the RFF file to send based on any of the referrer, the contact, specific categories and the communication devices being used.

A contact can require that it only receive Information falling into certain desired categories. If the contact receives Information other than falling into their desired categories, then the Information is considered spam and the contact may opt out of receiving further Information. RFFware can prevent a referrer from sending to a contact Information that does not have the contact's desired categories.

Referrer attachments include any text, picture, video or auditory attachments that the referrer might wish to include with the Information when sending to a contact. The referrer attachment may be added to the RFF file along with the Information. A referrer attachment may explain the Information, it may relate to who the referrer is or why the referrer is sending the Information to the contact, it may augment the Information, and the like.

If an Information source specifies that Information is relevant to categories that are not relevant to the Information, the referrer can elect to stop using that Information source. RFFware may provide the ability for a contact to block Information sent from a particular referrer, and may provide the ability for a referrer to block Information sent from a particular Information source.

Typically, there is separate viewing/reading software, which may be a portion of the RFFware software described above that provides RFF file viewing/playing capability for a contact. The RFF file may include instructions for installing the viewing software on the contact's communication device. Accordingly, when a contact receives the RFF file and clicks on it, the relevant content is conveniently displayed.

A website may include an RFF link on its web pages such that when a referrer identifies an RFF file it wishes to transmit to contacts, the referrer clicks the RFF link and any of the following may occur: (a) RFFware software runs on the referrer's local computer; (b) a browser is opened allowing the referrer to access a remote version of the RFFware software; (c) a webmail program is launched or (d) the referrer's default email program is activated. In case (c) or (d), typically the resulting mail program (1) is pre-filled with an RFF file attachment where the RFF file may encapsulate (i) the content of the web page, (ii) an ad on the webpage or (iii) another portion of the webpage; (2) is pre-addressed with the contact data for the suggested contact list based on categories and (3) the referrer's master list of contacts is displayed with controls to add/delete contacts from the suggested contact list.

RFF files may be downloaded by a referrer and stored on the referrer's local computer, or the RFF files may be uploaded to a remote account of the referrer that is associated with a remote version of the RFFware software.

An RFF link on a webpage may be context dependent or depend on where it is located on the webpage. For instance, a webpage for an online shopping aggregator may comprise a list of products by different vendors, in addition to a banner ad along the top. The banner ad may have an associated RFF link; each product and/or vendor listed may have their own associated RFF link; and the entire page may have an RFF link.

When the referrer and contact are members of the same social network organization, typically the referrer may select (e.g., by clicking) an RFF link on a webpage of the social network organization which allows the referrer to automatically, or otherwise easily match Information with the contact based on categories and then transmit the Information or an associated RFF file to the contact.

Besides selecting an RFF link on a webpage to activate the RFFware software, another way a referrer may access Information and transmit it to contacts is by logging into an account running the RFFware software. Upon logging in, the referrer may see a matrix where each row is associated with different portions of Information and lists related data. Such rows of related data may include columns comprising any of the following: (1) select boxes for selecting that row corresponding to a particular portion of the Information; (2) summaries of the portion of Information, where such summaries may be links to an expanded description; (3) descriptors of the portion of Information, such as ad type, vendor, and the like; (4) the total number of contacts having categories matching the categories of the portion of Information; (5) the contacts who actually possess the categories matching the portion of Information; (6) some or all of the contact data associated with such contacts; (7) the consideration a referrer would make for sending the portion of Information to the listed contacts; (8) a check box for adding the referrer's referral ID and (9) a box for adding a personalized message. Associated with the matrix may be "send" and "cancel" buttons to cause the selected portions of Information to be transmitted to the matching contacts.

Using the subject invention to offer a referral network while protecting contact data is a useful technique to monetize social networks and Web 3.0 applications.

FIG. 1 is a block diagram showing first data 107 being communicated bidirectionally between an Information source 100 and an Information database 101, where the first data 107 may include Information communicated from the Information source 100 to the Information database 101. In this figure, the Information source 100 may be replaced by a multiplicity of independent Information sources, but to keep the figure clear, only one Information source 100 is shown here. In this figure, the Information database 101 may be replaced by a multiplicity of independent Information databases, but to keep the figure clear, only one Information database 101 is shown here. Second data 108 is communicated bidirectionally between the Information database 101 and a referrer 102, where the second data 108 communicated from the Information database 101 to the referrer 102 may include all or a portion of, a summary of, or a reference to, Information communicated from the Information source 100 to the Information database 101. In general, there may be multiple referrers such as referrer 102. Third data 109 is communicated bidirectionally between the referrer 102 and a first contact 103; fourth data 110 is communicated bidirectionally between the referrer 102 and a second contact 104; and fifth data 111 is communicated bidirectionally between the referrer 102 and an nth contact 105. The third data 109, fourth data 110 and fifth data 111 communicated from the referrer 102 may include all or a portion of, a summary of, or a reference to, Information communicated from the Information database 101 to the referrer 102. The referrer 102 may access the referrer's contact database 106. In this figure, the contact database 106 may be replaced by a multiplicity of independent contact databases, but to keep the figure clear, only one contact database 106 is shown here.

Contact 103 may communicate sixth data 112 to the Information database 101 or may communicate seventh data 115 to the Information source 100; contact 104 may communicate eighth data 113 to the Information database 101 or may communicate ninth data 116 to the Information source 100; contact 105 may communicate tenth data 114 to the Information database 101 or may communicate eleventh data 117 to the Information source 100. The Information database 101 may only initiate communication with contact 103, 104 or 105 when directed by the referrer 102, and the Information source 100 may not initiate communication with contact 103, 104 or 105. Twelfth data 118 may be communicated between contact 103 and contact 104; thirteenth data 119 may be communicated between contact 104 and contact 105; and fourteenth data 120 may be communicated between contact 103 and contact 105.

Figure 2:
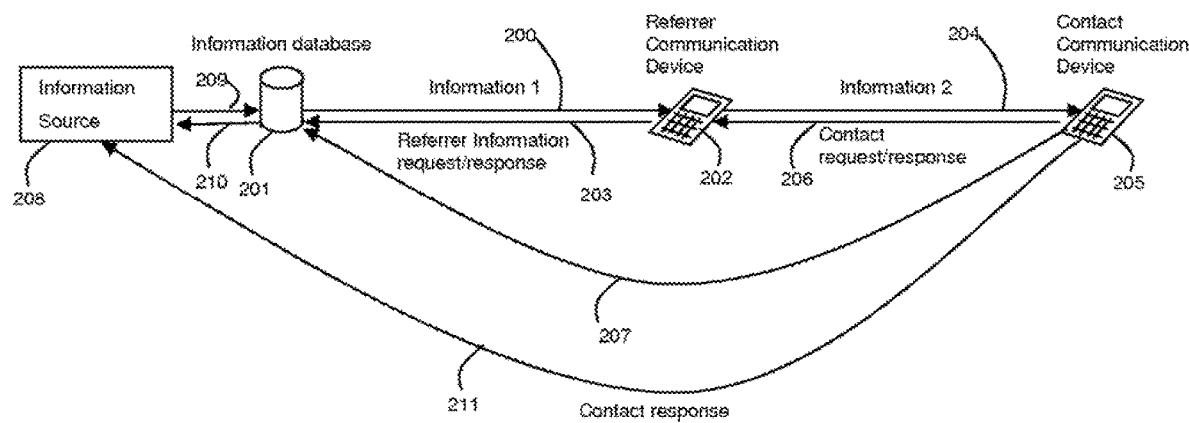
FIG. 2 is a block diagram depicting Information flow from an Information source to a contact whose contact data is stored on the mobile communication device of a referrer.

FIG. 2 is a block diagram showing Information 209 from an Information source 208 being provided to the contact communication device 205 of a contact, where contact data is not known by the Information source 208 but is known by a referrer. In this figure, the Information source 208 may be replaced by a multiplicity of independent Information sources, but to keep the figure clear, only one Information source 208 is shown here. The Information source provides Information 209 to an Information database 201. In this figure, the Information database 201 may be replaced by a multiplicity of independent Information databases, but to keep the figure clear, only one Information database 201 is shown here. The Information database 201 may communicate 210 back to the Information source 208. The Information database then provides all or a portion of, a summary of, or a reference to, the Information 209 as Information 1200 to a referrer communication device 202 of the referrer. In general, there may be multiple referrers each using their own referrer communication devices such as referrer communication device 202. Using the referrer communication device 202, the referrer may request 203 the information 1 200 or otherwise communicate with the Information database 201. The referrer may also use the referrer communication device 202 to reply 203 to the Information database 201 after receiving the Information 1 200.

Typically, the referrer communication device 202 accesses contact data from one or more contact lists or contact databases of contact data. In FIG. 2, the referrer communication device 202 is a mobile phone which has a contact database on it. The referrer selects contact data for a contact from the contact database and transmits all or a portion of, a summary of, or a reference to, Information 1200 as Information 2204 to the contact communication device 205 of the contact. In general, a referrer may send Information to multiple contact communication devices such as the contact communication device 205. Using its contact communication device 205, the contact may respond 206 to the referrer communication device 202. It is also possible for a contact to initiate a message to a referrer, for instance, to request Information from one or more Information sources, such as Information 209 from Information source 208, or to provide or update its requested categories. Using its contact communication device 205, a contact may also communicate 207 to the Information database 201. Such a communication 207 may be to provide or update the contact's requested categories. Using its contact communication device 205, a contact may also respond 211 to the Information source 208. Such a response 211 may be requested as part of the Information 209 from Information source 208.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

The invention claimed is:

1. A method for communicating information, from an information source to a contact communication device, via a referrer device, the method comprising:
   encoding a referral container file with programming instructions configured to, upon execution by a processor of the contact communication device, cause the contact communication device to electronically request information from the information source via a communications network;
   embedding the referral container file in a first electronic message; and
   transmitting, via a network communication interface, via the communications network, the first electronic message to the contact communication device.

2. The method of claim 1, further comprising:
   detecting, prior to the encoding of the referral container file, an electronic request to provide the information from the information source to the contact communication device, wherein contact data for a contact associated with the contact communication device is not accessible by the information source.

3. The method of claim 2,
   providing, via the network communication interface, criteria associated with the information; and
   automatically determining that the contact data is matched to the criteria based on electronically evaluating the contact data against the criteria.

4. The method of claim 3, further comprising:
   determining that data associated with the contact matches one or more of a type or category of the information specified by the information source.

5. The method of claim 1, wherein the programming instructions are configured to, upon execution by the processor of the contact communication device, cause the contact communication device to automatically install an application that provides features to one or more of edit a content of the information or make purchases related to the content.

6. The method of claim 1, wherein the referral container file comprises a referral identification, the referral identification comprised of identification information of the referrer device.

7. The method of claim 6, wherein the programming instructions are configured to, upon execution by the processor of the contact communication device, cause the contact communication device to further provide the referral identification for a referrer associated with the referrer device to the information source in conjunction with an activity performed by the contact communication device in connection with the information.

8. A device for communicating information, from an information source to a contact communication device, via a referrer device, the device comprising:
   one or more processors;
   a network communication interface; and
   one or more memory storage devices configured to store a first set of instructions, which when executed by at least one of the one or more processors, cause the referrer device to perform operations to:
   encoding a referral container file with programming instructions configured to, upon execution by a processor of the contact communication device, cause the contact communication device to electronically request information from the information source via a communications network;
   embedding the referral container file in a first electronic message; and
   transmitting, via llallthe network communication interface, via the communications network, the first electronic message to the contact communication device.

9. The device of claim 8, wherein the one or more memory storage devices configured to store the first set of instructions, which when executed by the at least one of the one or more processors, further cause the device to perform operations to:

detect, prior to the encoding of the referral container file, an electronic request to provide the information from the information source to the contact communication device, wherein contact data for a contact associated with the contact communication device is not accessible by the information source.

10. The device of claim 9, wherein the one or more memory storage devices configured to store the first set of instructions, which when executed by the at least one of the one or more processors, further cause the device to perform operations to:

provide, via the network communication interface, criteria associated with the information; and
  automatically determine that the contact data is matched to the criteria based on electronically evaluating the contact data against the criteria.

11. The device of claim 10, wherein the one or more memory storage devices configured to store the first set of instructions, which when executed by the at least one of the one or more processors, further cause the device to perform operations to:

determine that data associated with the contact matches one or more of a type or category of the information specified by the information source.

12. The device of claim 8, wherein the programming instructions are configured to, upon execution by the processor of the contact communication device, cause the contact communication device to automatically install an application that provides features to one or more of edit a content of the information or make purchases related to the content.

13. The device of claim 8, wherein the referral container file comprises a referral identification, the referral identification comprised of identification information of the referrer device.

14. The device of claim 13, wherein the programming instructions are configured to, upon execution by the processor of the contact communication device, cause the contact communication device to further provide the referral identification for a referrer associated with the referrer device to the information source in conjunction with an activity performed by the contact communication device in connection with the information.

15. A computer readable medium for communicating information, from an information source to a contact communication device, via a referrer device, the computer readable medium comprising one or more non-transitory, computer-readable storage media having instructions stored thereon, which, when executed by a set of one or more processors of a device, cause the device to perform operations comprising:

encoding a referral container file with programming instructions configured to, upon execution by a processor of the contact communication device, cause the contact communication device to electronically request information from the information source via a communications network;
  embedding the referral container file in a first electronic message; and
  transmitting, via a network communication interface, via the communications network, the first electronic message to the contact communication device.

16. The computer readable medium of claim 15, said operations further comprising:

detecting, prior to the encoding of the referral container file, an electronic request to provide the information from the information source to the contact communication device, wherein contact data for a contact associated with the contact communication device is not accessible by the information source.

17. The computer readable medium of claim 16, said operations further comprising:

providing, via the network communication interface, criteria associated with the information; and
  automatically determining that the contact data is matched to the criteria based on electronically evaluating the contact data against the criteria.

18. The computer readable medium of claim 17, said operations further comprising: determining that data associated with the contact matches one or more of a type or category of the information specified by the information source.

19. The computer readable medium of claim 15, wherein the programming instructions are configured to, upon execution by the processor of the contact communication device, cause the contact communication device to automatically install an application that provides features to one or more of edit a content of the information or make purchases related to the content.

20. The computer readable medium of claim 15, wherein the referral container file comprises a referral identification, the referral identification comprised of identification information of the referrer device.

21. The computer readable medium of claim 20, wherein the programming instructions are configured to, upon execution by the processor of the contact communication device, cause the contact communication device to further provide the referral identification for a referrer associated with the referrer device to the information source in conjunction with an activity performed by the contact communication device in connection with the information.

* * * * *